United States Patent
Sato et al.

(10) Patent No.: US 12,120,490 B2
(45) Date of Patent: Oct. 15, 2024

(54) FILTER COEFFICIENT OPTIMIZATION APPARATUS, FILTER COEFFICIENT OPTIMIZATION METHOD, AND PROGRAM

(71) Applicant: NIPPON TELEGRAPH AND TELEPHONE CORPORATION, Tokyo (JP)

(72) Inventors: Ryotaro Sato, Tokyo (JP); Kenta Niwa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 140 days.

(21) Appl. No.: 17/801,754

(22) PCT Filed: Feb. 28, 2020

(86) PCT No.: PCT/JP2020/008233
§ 371 (c)(1),
(2) Date: Aug. 23, 2022

(87) PCT Pub. No.: WO2021/171533
PCT Pub. Date: Sep. 2, 2021

(65) Prior Publication Data
US 2023/0088204 A1      Mar. 23, 2023

(51) Int. Cl.
*H04R 3/00* (2006.01)
*G06F 17/18* (2006.01)
*H04R 3/04* (2006.01)

(52) U.S. Cl.
CPC .............. *H04R 3/005* (2013.01); *G06F 17/18* (2013.01); *H04R 3/04* (2013.01)

(58) Field of Classification Search
CPC ... H04R 1/32; H04R 1/20; H04R 3/04; H04R 3/005; H04R 2201/40; H04R 2430/21; H04R 2430/23

(Continued)

(56) References Cited

U.S. PATENT DOCUMENTS

| | | | |
|---|---|---|---|
| 9,456,276 B1* | 9/2016 | Chhetri | H04R 3/005 |
| 11,881,206 B2* | 1/2024 | Ziv | H04R 5/04 |
| 11,908,487 B2* | 2/2024 | Kagoshima | H04R 1/326 |

OTHER PUBLICATIONS

J. Capon (1969) "High-resolution frequency-wavenumber spectrum analysis", Proceedings of the IEEE, vol. 57, No. 8, pp. 1408-1418.

(Continued)

*Primary Examiner* — Disler Paul

(57) ABSTRACT

Provided is a filter coefficient optimization technology that makes it possible to design a stable beamformer having a good quality by considering the relationship of a filter coefficient between adjacent frequency bins. A filter coefficient optimization apparatus includes an optimization unit that calculates an optimum value of a filter coefficient $w=\{w_1, \ldots, w_F\}$ ($w_f$ is a filter coefficient of a frequency bin f) of a beamformer that emphasizes sound (target sound) from D sound source, $a_{f,d}$ being an array manifold vector in the frequency bin f corresponding to a sound wave that comes from an angular direction $\theta_d$ in which a sound source d exists, the sound wave being a plane wave, the optimization unit calculating the optimum value based on an optimization problem of a cost function defined using a sum of a sum of a cost function $L_{MV\_f}(w_f)$ and a predetermined regularization term, under a predetermined constraint condition, the predetermined regularization term being defined using a difference in phase between adjacent frequency bins relevant to a response $w_f^H a_{f,d}$ of the beamformer in the frequency bin f for the angular direction $\theta_d$.

13 Claims, 5 Drawing Sheets

FILTER COEFFICIENT OPTIMIZATION ALGORITHM

1: Initialize $\alpha_0[c_f]=0$ (f=1,...,F)
2: for f=1, ..., F do
3:  for $c_f$=(1, ..., 1), ... , (C, ..., C) do
4:   $w_f^{dp}[c_f] \leftarrow \text{argmin}_{w\_f} L_{MV\_f}(w_f)$
    s.t. $\angle (w_f^H a_{f,d}) \in [2\pi(c_{f,d}-1)/C, 2\pi c_{f,d}/C]$ (d=1,...,D),
    $w_f^H a_{f,1} = 1$
5:   $c_f^{prev}[c_f] \leftarrow \text{argmin}_{c'_{f-1}}(\alpha_{f-1}[c'_{f-1}] + ^{\Lambda}L_{\eta f-1}(c'_{f-1}, c_f))$
6:   $\alpha_f[c_f] \leftarrow \alpha_{f-1}[c_f^{prev}[c_f]] + ^{\Lambda}L_{\eta f-1}(c_f^{prev}[c_f], c_f) + L_{MV\_f}(w_f^{dp}[c_f])$
7:  end for
8: end for
9: $c_{opt} \leftarrow \text{argmin}_c \alpha_F[c]$
10: for f=F, ..., 1 do
11:  $w_f^* \leftarrow w_f^{dp}[c_{opt}]$
12:  $c_{opt} \leftarrow c_f^{prev}[c_{opt}]$
13: end for
14: return $\{w_1^*, \ldots, w_F^*\}$

(58) Field of Classification Search
USPC .................................................. 381/56, 92
See application file for complete search history.

(56) References Cited

OTHER PUBLICATIONS

Futoshi Asano (2011) "Acoustic Technology Series 16, Array signal processing for acoustics: localization, tracking and separation of sound sources, edited by The Acoustical Society of Japan", Corona Publishing Co., Ltd., pp. 86-90.

* cited by examiner

---

FILTER COEFFICIENT OPTIMIZATION ALGORITHM

1: Initialize $a_0[c_f]=0$ $(f=1,\ldots,F)$
2: for $f=1, \ldots, F$ do
3:    for $c_f=(1, \ldots, 1), \ldots, (C, \ldots, C)$ do
4:       $w_f^{dp}[c_f] \leftarrow \mathrm{argmin}_{w\_f} L_{MV\_f}(w_f)$
         s.t. $\angle(w_f^H a_{f,d}) \in [2\pi(c_{f,d}-1)/C, 2\pi c_{f,d}/C](d=1,\ldots,D)$,
         $w_f^H a_{f,1}=1$
5:       $c_f^{prev}[c_f] \leftarrow \mathrm{argmin}_{c'\_f-1}(a_{f-1}[c'_{f-1}]+^{\wedge}L_{\eta f-1}(c'_{f-1}, c_f))$
6:       $a_f[c_f] \leftarrow a_{f-1}[c_f^{prev}[c_f]]+^{\wedge}L_{\eta f-1}(c_f^{prev}[c_f], c_f)+L_{MV\_f}(w_f^{dp}[c_f])$
7:    end for
8: end for
9: $c_{opt} \leftarrow \mathrm{argmin}_c a_F[c]$
10: for $f=F, \ldots, 1$ do
11:   $w_f^* \leftarrow w_f^{dp}[c_{opt}]$
12:   $c_{opt} \leftarrow c_f^{prev}[c_{opt}]$
13: end for
14: return $\{w_1^*, \ldots, w_F^*\}$

LATENT VARIABLE OPTIMIZATION ALGORITHM

1: for $(c_1, \ldots, c_D)=(1, \ldots, 1), \ldots, (C, \ldots, C)$ do
2:   $\tilde{w}^{candidate}[(c_1, \ldots, c_D)] \leftarrow \mathrm{argmin}_{\tilde{w}}(L_{convex}(\tilde{w})+\Sigma_{d=1}^D \wedge_{d,c\_d}(\tilde{w}))$
3:   $x[(c_1, \ldots, c_D)] \leftarrow L_{convex}(\tilde{w}^{candidate}[(c_1, \ldots, c_D)])$
      $+\Sigma_{d=1}^D \wedge_{d,c\_d}(\tilde{w}^{candidate}[(c_1, \ldots, c_D)])$
4: end for
5: $(c'_1, \ldots, c'_D) \leftarrow \mathrm{argmin}_{c\_1,\ldots,c\_D} x[(c_1, \ldots, c_D)]$
6: return $\tilde{w}^{candidate}[(c'_1, \ldots, c'_D)]$

Fig. 2

| FILTER COEFFICIENT OPTIMIZATION ALGORITHM |
|---|
| 1: for $f=1, \ldots, F$ do <br> 2:   for $c_f = (1, \ldots, 1), \ldots, (C, \ldots, C)$ do <br> 3:     $w_f^{candidate}[c_f] \leftarrow \text{argmin}_{w\_f}(L_{MV\_f}(w_f) + \Sigma_{d=1}^{D} \Lambda_{(f,d),c\_f,d}(w_f^H a_{f,d}))$ <br> 4:   end for <br> 5:   $c_{opt\,f} \leftarrow \text{argmin}_{c\_f}(L_{MV\_f}(w_f^{candidate}[c_f]) + \Sigma_{d=1}^{D} \Lambda_{(f,d),c\_f,d}(w_f^{candidate}[c_f]^H a_{f,d}))$ <br> 6:   $w_f^* \leftarrow w_f^{candidate}[c_{opt\,f}]$ <br> 7: end for <br> 8: return $\{w_1^*, \ldots, w_F^*\}$ |

Fig. 3

| FILTER COEFFICIENT OPTIMIZATION ALGORITHM |
|---|
| 1:  Initialize $\alpha_0[c_f]=0$ $(f=1,\ldots,F)$ <br> 2:  for $f=1, \ldots, F$ do <br> 3:    for $c_f = (1, \ldots, 1), \ldots, (C, \ldots, C)$ do <br> 4:     $w_f^{dp}[c_f] \leftarrow \text{argmin}_{w\_f}(L_{MV\_f}(w_f) + \Sigma_{d=1}^{D} \Lambda_{(f,d),c\_f,d}(w_f^H a_{f,d}))$ <br> 5:     $c_f^{prev}[c_f] \leftarrow \text{argmin}_{c'\_{f-1}}(\alpha_{f-1}[c'_{f-1}] + \Lambda_{\eta f-1}(c'_{f-1}, c_f))$ <br> 6:     $\alpha_f[c_f] \leftarrow \alpha_{f-1}[c_f^{prev}[c_f]] + \Lambda_{\eta f-1}(c_f^{prev}[c_f], c_f) + L_{MV\_f}(w_f^{dp}[c_f])$ <br>        $+ \Sigma_{d=1}^{D} \Lambda_{(f,d),c\_f,d}(w_f^{dp}[c_f]^H a_{f,d})$ <br> 7:    end for <br> 8:   end for <br> 9:  $c_{opt} \leftarrow \text{argmin}_c \alpha_F[c]$ <br> 10: for $f=F, \ldots, 1$ do <br> 11:   $w_f^* \leftarrow w_f^{dp}[c_{opt}]$ <br> 12:   $c_{opt} \leftarrow c_f^{prev}[c_{opt}]$ <br> 13: end for <br> 14: return $\{w_1^*, \ldots, w_F^*\}$ |

Fig. 4

FILTER COEFFICIENT OPTIMIZATION APPARATUS, FILTER COEFFICIENT OPTIMIZATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/008233, filed on 28 Feb. 2020, the disclosure of which is hereby incorporated herein by reference in its entirety.

TECHNICAL FIELD

The present invention relates to a technology for optimizing a filter coefficient in target sound emphasis.

BACKGROUND ART

A beamforming using a microphone array is well known as a signal processing technique for emphasizing only sound (hereinafter referred to as target sound) that comes from a particular angular direction and suppressing sound (hereinafter referred to as non-target sound) that comes from other angular directions. This technique has been put to practical use in a telephone meeting system, a communication system in an automobile, a smart speaker, and the like.

In many conventional techniques relevant to the beamforming, an optimum filter is derived by solving an optimization problem of a cost function under some sort of constraint. For example, an MVDR (Minimum Variance Distortionless Response) beamformer described in Non Patent Literature 1 is obtained by using the power of an output signal as a cost function and minimizing this under a distortionless constraint condition for a target sound source angular direction.

Further, techniques of suppressing the non-target sound while imposing a constraint relevant to responses for a plurality of sound source directions in a situation where sound sources to be emphasized are in a plurality of angular directions have been already proposed as a beamformer design technique using a minimum variance method such as the technique described in Non Patent Literature 1. As one of them, there is an LCMV (Linearly Constrained Minimum Variance) beamformer (see Non Patent Literature 2). The LCMV beamformer emphasizes the target sound by imposing an equality constraint to responses of the beamformer for a plurality of angular directions, and suppresses the non-target sound by minimizing the variance of the output signal. A design technique for the LCMV beamformer will be described below in detail.

First, various definitions and notations are introduced. Hereinafter, signals are handled as values in time-frequency region after short-time Fourier transform.

A subscript of a time frame is expressed as $t=1, \ldots, T$, and a subscript of a frequency bin is expressed as $f=1, \ldots, F$. Further, complex conjugate transpositions of a vector v and a matrix M are expressed as a superscript $^H$, as shown by $v^H$ and $M^H$.

In the design of the LCMV beamformer, a linear filter (beamformer) that eliminate the non-target sound as unnecessary sound from an observation signal of a microphone array constituted by M microphone elements and emphasizes the target sound as the sound from a plurality of preset angular directions is configured. An observation signal for an M channel of the microphone array in a time frame t and a frequency bin f is shown as $x_{f,t} \in C^M$ ($f=1, \ldots, F$, $t=1, \ldots, T$). A situation where D sound sources as signal sources that emit sound exist far off and a virtual plane wave comes to the microphone array is assumed. Further, it is assumed that all sound sources and all microphone elements are on identical planes. A signal that is emitted from a sound source d ($d=1, \ldots, D$) and that comes to the microphone array in the time frame t and the frequency bin f is shown as $s_{d,f,t} \in C$ ($d=1, \ldots, D$, $f=1, \ldots, F$, $t=1, \ldots, T$). It is assumed that the sound of the sound source d comes from an angular direction $\theta_d$. It is assumed that the angular direction $\theta_d$ is known.

When an array manifold vector (hereinafter referred to as an array manifold vector in the frequency bin f corresponding to a sound wave as a plane wave that comes from the angular direction $\theta_d$) in the frequency bin f from the sound source d to M microphone elements of the microphone array is shown as $a_{f,d} \in C^M$ ($f=1, \ldots, F$, $d=1, \ldots, D$), the observation signal $x_{f,t}$ is expressed by the following expression.

[Math. 1]

$$x_{f,t} = \sum_{d=1}^{D} s_{d,f,t} a_{f,d} + n_{f,t} \tag{1}$$

Here, $n_{f,t}$ ($f=1, \ldots, F$, $t=1, \ldots, T$) expresses a noise component including noises added in the course of the observation and other echoes and non-directional noises. The array manifold vector $a_{f,d}$ is a quantity that is automatically determined for each frequency bin f from physical characteristics of the microphone array and the whole system.

Hereinafter, a linear filter in the frequency bin f is expressed as $w_f \in C^M$ ($f=1, \ldots, F$), and this is referred to as a filter coefficient of the beamformer. The filter coefficient determines the behavior of the beamformer.

An output signal $y_{f,t}$ ($f=1, \ldots, F$, $t=1, \ldots, T$) of the beamformer is expressed by the following expression.

[Math. 2]

$$y_{f,t} = w_f^H x_{f,t} \tag{2}$$

That is, the design of the beamformer is the design of a filter coefficient $w_f$ ($f=1, \ldots, F$) that meets Expression (2).

An inner product $w_f^H a_{f,d}$ of the filter coefficient $w_f$ and the array manifold vector $a_{f,d}$ means a response characteristic of the beamformer in the frequency bin f for the angular direction $\theta_d$. Accordingly, in a situation where it is desirable to certainly collect, at a constant gain, the sound that comes from a sound source in the angular direction $\theta_d$ (that is, from the sound source d), a method of imposing the following constraint condition (referred to as a distortionless constraint condition) on the filter coefficient $w_f$ is often used.

[Math. 3]

$$w_f^H a_{f,d} = 1 \tag{3}$$

($f=1, \ldots, F$)

It is possible to achieve the emphasis of the sound that comes from the sound source d, by setting the filter coefficient $w_f$ such that the distortionless constraint condition is met and gains for signals from unnecessary sound sources are reduced as much as possible.

In the case where it is desirable to concurrently emphasize the sound that comes from a plurality of sound sources, it is only necessary to concurrently impose a plurality of distortionless constraint conditions.

Since the beamformer is required to suppress the non-target sound, it is desired to set the filter coefficient $w_f$ such that the non-target sound is minimized under the constraint of the target sound emphasis. For mathematically formulating this, a cost function expressing the variance of the non-target sound is defined. It is expected that it is possible to design a desired beamformer by setting the filter coefficient such that the cost function is minimized.

When a spatial correlation matrix $R_f$ (f=1, ..., F) of the non-target sound is defined as $R_f := E_t[x_{f,t} x_{f,t}^H]$, a cost function $L_{MV\_f}(w_f)$ expressing the variance of the non-target sound can be defined for each of the frequency bins f=1, ..., F. Specifically, the cost function $L_{MV\_f}(w_f)$ is shown as the following expression.

[Math. 4]

$$L_{MV_f}(w_f) = w_f^H R_f w_f \quad (4)$$

It is possible to design the beamformer by setting the filter coefficient $w_f$ (f=1, ..., F) such that the sum of the cost function $L_{MV\_f}(w_f)$ is minimized under the constraint condition in Expression (3). When this is expressed as a mathematical expression, an optimization problem in the following expression is obtained.

[Math. 5]

$$\min_{w_1, \cdots, w_F} \sum_f L_{MV_f}(w_f) \quad (5)$$

$$\text{s.t. } w_f^H a_{f,d} = 1 (f = 1, ..., F, d = 1, ..., D)$$

By solving the optimization problem in Expression (5), it is possible to obtain the optimum filter coefficient.

The optimization problem in Expression (5) can be divided into individual optimization problems for the respective frequency bins f=1, ..., F. That is, for the frequency bin f, an optimization problem in the following expression may be solved instead of the optimization problem in Expression (5).

[Math. 6]

$$\min_{w_f} L_{MV_f}(w_f) \quad (6)$$

$$\text{s.t. } w_f^H a_{f,d} = 1 (d = 1, ..., D)$$

By solving the optimization problem in Expression (5) or Expression (6) described above, it is possible to design the LCMV beamformer. This is the conventional design technique for the LCMV beamformer.

CITATION LIST

Non-Patent Literature

Non-Patent Literature 1: J. Capon, "High-resolution frequency-wavenumber spectrum analysis", Proceedings of the IEEE, vol. 57, no. 8, pp. 1408-1418, August 1969.
Non-Patent Literature 2: Futoshi Asano, "Acoustic Technology Series 16, Array signal processing for acoustics: localization, tracking and separation of sound sources, edited by The Acoustical Society of Japan", Corona Publishing Co., Ltd., pp. 86-90, 2011.

SUMMARY OF THE INVENTION

Technical Problem

In the conventional design technique for the LCMV beamformer, it is necessary to solve the optimization problem in Expression (5).

However, in the optimization problem in Expression (5), the relationship of the filter coefficient between adjacent frequency bins is not considered, and specifically, the reduction in the phase difference between adjacent frequency bins is not considered, so that it is not possible to design a stable beamformer having a good quality.

Hence, the present invention has an object to provide a filter coefficient optimization technology that makes it possible to design a stable beamformer having a good quality by considering the relationship of the filter coefficient between adjacent frequency bins.

Means for Solving the Problem

An aspect of the present invention is a filter coefficient optimization apparatus including an optimization unit that calculates an optimum value w* of a filter coefficient w={$w_1$, ..., $w_F$} ($w_f$ (f=1, ..., F, F is an integer equal to or more than 1) is a filter coefficient of a frequency bin f) of a beamformer that emphasizes sound (hereinafter referred to as target sound) from D sound sources (hereinafter referred to as a sound source 1, ..., a sound source D), D being an integer equal to or more than 1, $R_f$ (f=1, ..., F) being a spatial correlation matrix for sound other than the target sound relevant to the frequency bin f, $L_{MV\_f}(w_f) = w_f^H R_f w_f$ (f=1, ..., F) being a cost function relevant to a filter coefficient $w_f$, $\theta_d$ (d=1, ..., D) being an angular direction in which a sound source d exists, $a_{f,d}$ (f=1, ..., F, d=1, ..., D) being an array manifold vector in the frequency bin f corresponding to a sound wave that comes from the angular direction $\theta_d$, the sound wave being a plane wave, L(w) being a cost function relevant to the filter coefficient w and being defined using a sum of a sum $\Sigma_{f=1}^F L_{MV\_f}(w_f)$ of the cost function $L_{MV\_f}(w_f)$ and a predetermined regularization term, the optimization unit calculating the optimum value w* based on an optimization problem $\min_w L(w)$ relevant to the filter coefficient w, under a predetermined constraint condition, the predetermined regularization term being defined using a difference in phase between adjacent frequency bins relevant to a response $w_f^H a_{f,d}$ (f=1, ..., F, d=1, ..., D) of the beamformer in the frequency bin f for the angular direction $\theta_d$.

An aspect of the present invention is a filter coefficient optimization apparatus including an optimization unit that calculates an optimum value w* of a filter coefficient w={$w_1$, ..., $w_F$} ($w_f$ (f=1, ..., F, F is an integer equal to or more than 1) is a filter coefficient of a frequency bin f) of a beamformer that emphasizes sound (hereinafter referred to as target sound) from D sound sources (hereinafter referred to as a sound source 1, ..., a sound source D), D being an integer equal to or more than 1, $\theta_d$ (d=1, ..., D) being an angular direction in which a sound source d exists, $a_{f,d}$ (f=1, ..., F, d=1, ..., D) being an array manifold vector in the frequency bin f corresponding to a sound wave that comes from the angular direction $\theta_d$, the sound wave being a plane wave, the optimization unit calculating the optimum value w* by performing derivation so as to reduce a difference in phase between adjacent frequency bins relevant to a response $w_f^H a_{f,d}$ (f=1, ..., F, d=1, ..., D) of the beamformer in the frequency bin f for the angular direction $\theta_d$.

Effects of the Invention

According to the present invention, it is possible to design a stable beamformer having a good quality, by optimizing the filter coefficient in consideration of the relationship of the filter coefficient between adjacent frequency bins.

BRIEF DESCRIPTION OF DRAWINGS

FIG. 1 is a diagram showing a filter coefficient optimization algorithm.

FIG. 2 is a diagram showing a latent variable optimization algorithm.

FIG. 3 is a diagram showing a filter coefficient optimization algorithm.

FIG. 4 is a diagram showing a filter coefficient optimization algorithm.

DESCRIPTION OF EMBODIMENTS

Figure 5:
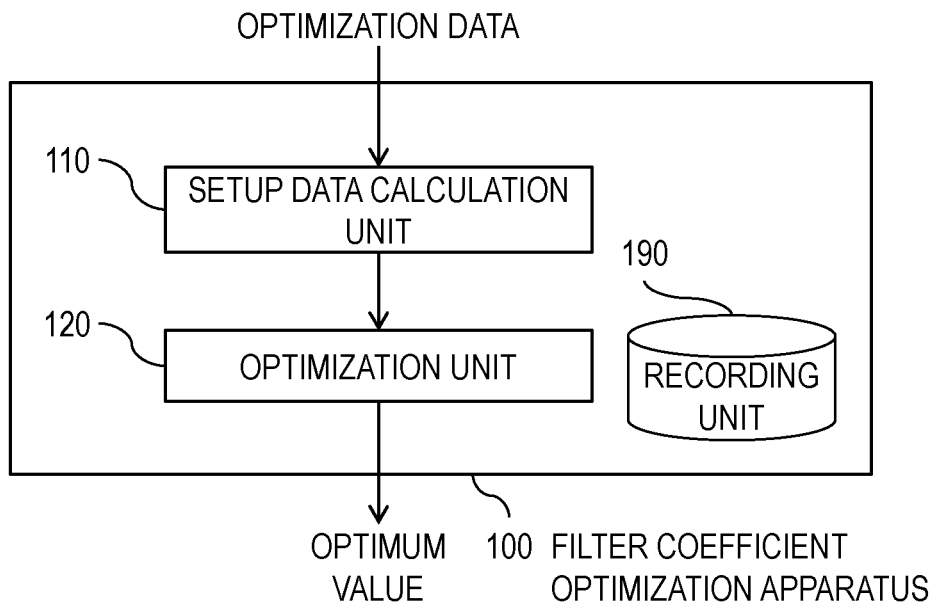
FIG. 5 is a block diagram showing the configuration of a filter coefficient optimization apparatus 100.

Embodiments of the present invention will be described below in detail. Component units having identical functions are denoted by identical numerals, and repetitive descriptions are omitted.

Before the description of the embodiments, the notation method in the specification will be described.

"_" (underscore) indicates an inferior subscript. For example, "$x^{y\_z}$" shows that "$y_z$" is a superscript for "x", and "$x_{y\_z}$" shows that "$y_z$" is an inferior subscript for "x".

Further, for a certain character "x", superscripts "^" and "~" for "^x" and "~x" should be originally put just above "x", but "^x" and "~x" are shown because of the constraint about the notation in the specification.

<Technical Background>

A cost term (hereinafter referred to as a regularization term) in which the relationship of the filter coefficient between adjacent frequency bins is considered can be used for designing a stable beamformer having a good quality. In this technique, a new cost function is introduced by adding the regularization term to the cost function $\Sigma_f L_{MV\_f}(w_f)$ described in Background Art, and the filter coefficient is determined by solving an optimization problem of the new cost function. When a first order difference and a second order difference in a frequency direction of a phase component related to the filter coefficient are used as the relationship of the filter coefficient between adjacent frequency bins, it is expected that it is possible to design a filter having a stable delay characteristic by using a regularization term corresponding to the first order difference and the second order difference, because the first order difference and the second order difference correspond to a phase delay and a group delay respectively.

The reason why the simple difference in the filter coefficient is not used as the relationship of the filter coefficient between adjacent frequency bins is that the calculation amount can become enormous. For avoiding this problem, in the invention in the present patent application, attention is focused on the difference in phase component related to the filter coefficient, in consideration of the correspondence to the above phase delay and group delay.

<<Regularization Term by Frequency-Directional Smoothing>>

Here, a regularization term using the difference in the phase component related to the filter coefficient will be descried as a regularization term by frequency-directional smoothing. The regularization term makes it possible to directly control the group delay and phase delay of the filter constituting the beamformer.

The response of the beamformer in the frequency bin f for the angular direction $\theta_d$ is expressed as a complex number $w_f^H a_{f,d}$. An absolute value $|w_f^H a_{f,d}|$ of the response $w_f^H a_{f,d}$ of the beamformer is referred to as an amplitude, and a deflection angle $\angle(w_f^H a_{f,d})$ is referred to as a phase. Two forms will be shown below as examples of the regularization term by the frequency-directional smoothing.

(Continuous Form)

As an example of the regularization term in the form, there is a regularization term that is defined by the first order difference in phase between adjacent frequency bins. This regularization term is given by the following expression.

[Math. 7]

$$\eta \sum_{f=1}^{F-1} \sum_{d=1}^{D} |\angle(w_f^H a_{f,d}) - \angle(w_{f+1}^H a_{f+1,d})|_{2\pi} \tag{7}$$

Further, as another example, there is a regularization term that is defined by the second order difference in phase between adjacent frequency bins. This regularization term is given by the following expression.

[Math. 8]

$$\eta \sum_{f=1}^{F-2} \sum_{d=1}^{D} |\angle(w_f^H a_{f,d}) - 2\angle(w_{f+1}^H a_{f+1,d}) + \angle(w_{f+2}^H a_{f+2,d})|_{2\pi} \tag{8}$$

In Expression (7) and Expression (8), $\eta$ ($\eta$ is a predetermined positive number) represents a weight parameter. Further, $|\bullet|_{2\pi}$ in Expression (7) and Expression (8) is a norm that is defined by the following expression.

[Math. 9]

$$|x|_{2\pi} = \min_{n=\ldots,-1,0,1,\ldots} |x - 2n\pi| \tag{9}$$

That is, $|x|_{2\pi}$ is a special norm in which the periodicity of a variable x is considered.

(Discrete Form)

For defining the regularization term in the form, a variable $c_{f,d}$ (f=1, ..., F, d=1, ..., D) that depends on the phase of the response $w_f^H a_{f,d}$ of the beamformer and that has discrete values is introduced for a filter coefficient $w_f$ and an array manifold vector $a_{f,d}$. Specifically, a complex plane is divided into C sectors that are around the origin and that have an equal central angle, consecutive numbers $1, \ldots, C$ are assigned in a counterclockwise manner, and $c_{f,d}$ is the number of a sector where the complex number $w_f^H a_{f,d}$ is positioned. Accordingly, the discrete variable $c_{f,d}$ has one value of $1, \ldots, C$. Further, the following expression is satisfied among the filter coefficient $w_f$, the array manifold vector $a_{f,d}$ and the discrete variable $c_{f,d}$.

[Math. 10]

$$\angle(w_f^H a_{f,d}) \in [2\pi(c_{f,d} - 1)/C, 2\pi c_{f,d}/C] \tag{10}$$

The regularization term in the following expression is defined using the discrete variable $c_{f,d}$ that meets Expression (10).

[Math. 11]

$$\eta \sum_{f=1}^{F-1} \sum_{d=1}^{D} |c_{f,d} - c_{f+1,d}|_C \tag{11}$$

In Expression (11), $\eta$ ($\eta$ is a predetermined positive number) represents a weight parameter. Further, $|\bullet|_c$ in Expression (11) is a norm that is defined by the following expression.

[Math 12]

$$|x|_C = \min_{n=\ldots,-1,0,1,\ldots} |x - nC| \tag{12}$$

That is, $|x|_c$ is a special norm in which the periodicity of the variable $x$ is considered.

In the case of $c_f = (c_{f,1}, \ldots, c_{f,D})$, the regularization term (hereinafter referred to as $\hat{L}_\eta(c_{1,1}, \ldots, c_{F,D})$) in Expression (11) is expressed as follows.

[Math. 13]

$$\hat{L}_\eta(c_{1,1}, \ldots, c_{F,D}) = \sum_{f=1}^{F-1} \hat{L}_{\eta f}(c_f, c_{f+1}) \tag{13}$$

$$\hat{L}_{\eta f}(c_f, c_{f+1}) = \eta \sum_{d=1}^{D} |c_{f,d} - c_{f+1,d}|_C \tag{14}$$

An example of the introduction of the regularization term $\hat{L}_\eta(c_{1,1}, \ldots, c_{F,D})$ in the design of the LCMV beamformer will be described below. Assuming that a particularly important target sound exists in the first angular direction (that is, an angular direction $\theta_1$) of D angular directions $\theta_1, \ldots, \theta_D$, a distortionless constraint condition $w_f^H a_{f,1} = 1$ ($f = 1, \ldots, F$) is imposed for the angular direction $\theta_1$. In this case, an optimization problem to be solved is shown as follows.

[Math. 14]

$$\min_{\{c_f, w_f\}_{f=1}^{F}} \left( \sum_{f=1}^{F} L_{MV_f}(w_f) + \sum_{f=1}^{F-1} \hat{L}_{\eta f}(c_f, c_{f+1}) \right) \tag{15}$$

$$\text{s.t.} \angle(w_f^H a_{f,d})$$
$$\in [2\pi(c_{f,d} - 1)/C, 2\pi c_{f,d}/C]$$
$$(f = 1, \ldots, F, d = 1, \ldots, D),$$
$$w_f^H a_{f,1} = 1 (f = 1, \ldots, F)$$

This optimization problem can be solved by evaluating optimum values of the filter coefficient $w_f$ that minimize a cost function $\Sigma_{f=1}^{F} L_{MV\_f}(w_f) + \Sigma_{f=1}^{F-1} \hat{L}_{\eta f}(c_f, c_{f+1})$ for all values that the discrete variable $c_f$ ($f=1, \ldots, F$) can have, and thereafter, among them, adopting the optimum value that minimizes the value of the cost function $\Sigma_{f=1}^{F} L_{MV\_f}(w_f) + \Sigma_{f=1}^{F-1} \hat{L}_{\eta f}(c_f, c_{f+1})$, but in fact, there is a more efficient algorithm. The algorithm is shown in FIG. 1.

When the value of the discrete variable $c_f$ is set, the optimum value of the filter coefficient $w_f$ is determined depending on only the value of the discrete variable $c_f$, regardless of the values of the other frequency bins. Therefore, by previously the filter coefficient $w^f$ for all values that $C^D$ discrete variables $c_f$ can have for each frequency bin f, the optimization problem results in a shortest path problem relevant to the discrete variable $c_f$. Accordingly, the optimization problem can be solved at high speed by applying a Dijkstra method. This is used in the algorithm in FIG. 1.

In the optimization problem in Expression (15), the distortionless constraint condition for one angular direction is used, but a distortionless constraint condition for a plurality of angular directions may be used. However, when the distortionless constraint condition for a plurality of angular directions is used, the constraint sometimes becomes excessively strict, so that the solution is not evaluated. The relaxation of the distortionless constraint condition is possible, but in this case, a non-convex optimization problem is sometimes obtained. Generally, it is difficult to solve the non-convex optimization problem. Hence, a technique for optimizing the filter coefficient by solving a convex optimization problem equivalent to the non-convex optimization problem instead of solving the non-convex optimization problem will be described below.

First, a method for transforming the non-convex optimization problem into the convex optimization problem equivalent to the non-convex optimization problem and a method for solving the convex optimization problem obtained by the transformation will be described. Next, two examples will be described as examples of the use of the method for the non-convex optimization problem obtained by the relaxation of the constraint condition.

<<Transformation into Convex Optimization Problem Equivalent to Non-Convex Optimization Problem and Solution Method>>

Here, a method for transforming the non-convex optimization problem into the convex optimization problem equivalent to the non-convex optimization problem and a method for solving the convex optimization problem obtained by the transformation will be described. An optimization problem relevant to a latent variable ~w that is defined by the following expression will be discussed below.

[Math. 15]

$$\min_{\tilde{w}}\left(L_{convex}(\tilde{w}) + \sum_{d=1}^{D} L_d(\tilde{w})\right) \quad (16)$$

Here, $L_{convex}$ is a strongly convex function relevant to the latent variable ~w, and $L_d$ (d=1, . . . , D, D is an integer equal to or more than 1) is a function relevant to the latent variable ~w. That is, $L_d$ (d=1, . . . , D) does not always need to be a convex function.

Generally, the optimization problem in Expression (16) is an optimization problem in which the cost function is a non-convex function, that is, a non-convex optimization problem. The non-convex optimization problem is a difficult problem as described above, and therefore, is intended to result in a convex optimization problem to be solved more easily, by introducing a certain kind of approximation. Hence, the function $L_d$(~w) (d=1, . . . , D) is intended to be approximated by a piecewise convex function constituted by a plurality of convex functions.

The definition of the piecewise convex function will be described below. For the function $L_d$(~w) (d=1, . . . , D) to be approximated, the domain is divided into regions $S_{d,1}, \ldots, S_{d,C}$ that are C closed convex sets. Then, a function $\hat{}_{d,c}$ (c=1, . . . , C) that is defined for each of the regions $S_{d,1}, \ldots, S_{d,C}$ is introduced. The newly introduced function $\hat{}_{d,c}$ is a convex function on the region $S_{d,c}$, and is a function for approximating the function $L_d$ on the region $S_{d,c}$. In the case where the function $L_d$ is a convex function on the region $S_{d,c}$, $\hat{}_{d,c}=L_d$ may be adopted on the region $S_{d,c}$. Thereby, the function $L_d$(~w) can be approximately expressed by the piecewise convex function $\hat{}_{d,c}$ (c=1, . . . , C). Generally, as the value (that is, the number into which the domain of the function $L_d$ is divided) of C is larger, the approximation can be performed by a more accurate piecewise convex function.

However, when the approximation is used, a discrete variable representing a region to which the optimum value as the solution of the optimization problem belongs is newly added as an optimized object, in addition to the latent variable that is an optimized object in the optimization problem in Expression (16), so that the number of variables to be optimized increases. However, when the discrete variable is fixed, for the latent variable, the optimization problem results in the convex optimization (instead of the non-convex optimization), and therefore can be solved relatively easily. This will be specifically described below. The optimization problem that is formulated using the approximation is expressed by the following expression, with $c_d$ (d=1, . . . , D) as a discrete variable that has a value of 1, . . . , C.

[Math. 16]

$$\min_{\tilde{w}}\left(L_{convex}(\tilde{w}) + \sum_{d=1}^{D} \min_{c_d} \Lambda_{d,c_d}(\tilde{w})\right) \quad (17)$$

Expression (17) is equivalent to the following expression.

[Math. 17]

$$\min_{c_1,\cdots,c_D}\left(\min_{\tilde{w}}\left(L_{convex}(\tilde{w}) + \sum_{d=1}^{D} \Lambda_{d,c_d}(\tilde{w})\right)\right) \quad (18)$$

In Expression (18), $\min_{\sim w}(L_{convex}(\sim w)+\Sigma_{d=1}^{D}\hat{}_{d,c\_d}(\sim w))$ is a convex optimization problem relevant to the latent variable ~w, and can be solved relatively easily. The procedure will be described below. First, the convex optimization problem $\min_{\sim w}(L_{convex}(\sim w)+\Sigma_{d=1}^{D}\hat{}_{d,c\_d}(\sim w))$ is solved for all values that the discrete variable $(c_1, \ldots, c_D)$ can have. Thereby, the solution of the convex optimization problem $\min_{\sim w}(L_{convex}(\sim w)+\Sigma_{d=1}^{D}\hat{}_{d,c\_d}(\sim w))$ is evaluated for all values that the $C^D$ discrete variables $(c_1, \ldots, c_D)$ can have. Then, among the obtained solutions of the convex optimization problem, a solution that minimizes the value the cost function $L_{convex}(\sim w)+\Sigma_{d=1}^{D}\hat{}_{d,c\_d}(\sim w)$ is adopted as the optimum value. Thereby, the optimization problem in Expression (18) can be solved. The procedure of the solution method is illustrated in FIG. 2.

The non-convex optimization problem in Expression (16) can be transformed into the convex optimization problem in Expression (18) that is equivalent to the non-convex optimization problem in Expression (16), and the convex optimization problem in Expression (18) can be solved by the latent variable optimization algorithm in FIG. 2.

Application Example

Here, an example in which the above-described versatile scheme of evaluating the optimum value after transforming the non-convex optimization problem into the convex optimization problem is applied to the non-convex optimization problem obtained by relaxing the constraint condition in Expression (3) will be described.

As described above, in the related art in Non Patent Literature 1, Expression (3) that is an equality constraint is imposed for many objects, and therefore, there is a fear that an appropriate filter coefficient cannot be obtained. Hence, it is intended to use a softer constraint condition that is suitable for a real situation. Specifically, it is intended to use a constraint condition (that is, a constraint condition in which there is no constraint relevant to the phase) in which a constraint is imposed for only the amplitude of the response of the beamformer, instead of the constraint condition in Expression (3). For example, the following expression can be used.

[Math. 18]

$$|w_f^H \alpha_{f,d}|=1 \quad (19)$$

Further, as another example, the following expression can be used.

[Math. 19]

$$|w_f^H \alpha_{f,d}| \geq 1 \quad (20)$$

The constraint condition in Expression (19) and the constraint condition in Expression (20) express the constraint that the amplitude of the response of the beamformer is a constant value (specifically, 1) and the constraint that the amplitude of the response of the beamformer only needs to be equal to or more than a constant value (specifically, 1), respectively. Each of the constraint condition in Expression (19) and the constraint condition in Expression (20) is mathematically classified into a non-convex constraint.

An optimization problem in which the constraint condition is Expression (20) will be discussed below. The constraint condition in Expression (20) shows that the absolute value of the complex number $w_f^H a_{f,d}$ is equal to or more than 1. This means that the complex number $w_f^H a_{f,d}$ needs to be geometrically positioned on a unit circle or outside the unit circle in the complex plane. Hence, first, the complex plane is equally divided into C sectors that are around the origin. The C sectors correspond to the C regions described above. Then, on the border or inside of each sector, Expression (20) that is the original constraint is approximated by C convex functions.

This will be specifically described below. The discrete variable $c_{f,d}$ is adopted as a variable that has a value of 1, ..., C, for the frequency bin f (f=1, ..., F) and the sound source d (d=1, ..., D). Further, $\gamma_{f,d} = w_f^H a_{f,d}$ is satisfied. A convex function $\hat{\Lambda}_{(f,d),c\_f,d}(\gamma_{f,d})$ ($c_{f,d}=1, \ldots, C$) that is defined for the frequency bin f (f=1, ..., F) and the sound source d (d=1, ..., D) is defined such that the values of the complex number $\gamma_{f,d}$ are restricted inside the sectors around the origin at a central angle $2\pi/C$ on the complex plane and in a range in which $|\gamma_{f,d}| \geq 1$ is met. Then, Expression (20) is approximated by a piecewise convex function using the C convex functions $\hat{\Lambda}_{(f,d),c\_f,d}(\gamma_{f,d})$ ($c_{f,d}=1, \ldots, C$).

For example, the function $\hat{\Lambda}_{(f,d),c\_f,d}$ may be a function expressed by the following expression.

[Math. 20]

$$\Lambda_{(f,d)c_{f,d}}(\gamma_{f,d}) := \qquad (21)$$

$$\begin{cases} 0 \left( R\left( \gamma_{f,d} e^{-2\pi j (c_{f,d}+1)/2C} \right) \geq 1, \frac{2\pi c_{f,d}}{C} \leq L\gamma_{f,d} \leq \frac{2\pi(c_{f,d}+1)}{C} \right) \\ \infty \text{ (otherwise)} \end{cases}$$

Here, R(z) represents the real part of a complex number z.

When the value of C is large, the approximation can be performed more accurately, but in the case of solving the optimization problem using the algorithm in FIG. 2, it is necessary to examine all combinations of the discrete variables, so that the calculation amount increases.

Thus, the filter coefficient optimization problem in which the constraint condition is Expression (20) results in a convex optimization problem in the following expression.

[Math. 21]

$$\min_{\{c_f, w_f\}_{f=1}^F} \left( \sum_{f=1}^F L_{MV_f}(w_f) + \sum_{f=1}^F \sum_{d=1}^D \Lambda_{(f,d),c_{f,d}}(w_f^H a_{f,d}) \right) \qquad (22)$$

Here, $c_f = (c_{f,1}, \ldots, c_{f,D})$ is satisfied.

This optimization problem can be solved by applying the latent variable optimization algorithm in FIG. 2. An algorithm for solving the optimization problem is shown in FIG. 3. That is, FIG. 3 shows a filter coefficient optimization algorithm that is obtained based on the latent variable optimization algorithm in FIG. 2.

Application Example 2

The optimization problem of the filter coefficient w that is defined using the cost function $\sum_{f=1}^F L_{MV_f}(w_f) + \sum_{f=1}^{F-1} \hat{L}_{\eta f}(c_f, c_{f+1})$ under the constraint condition $|w_f^H a_{f,d}| \geq 1$ (f=1, ..., F, d=1, ..., D) will be discussed. This problem is a non-convex optimization problem that is obtained by using the constraint condition $|w_f^H a_{f,d}| \geq 1$ (f=1, ..., F, d=1, ..., D) instead of the constraint condition $w_f^H a_{f,d} = 1$ (f=1, ..., F, d=1, ..., D).

Note that the discrete variable $c_{f,d}$ defined in <<Regularization Term by Frequency-Directional Smoothing>> and the discrete variable $c_{f,d}$ defined in <<Application Example>> are the same as each other. Thereby, the above non-convex optimization problem results in the following convex optimization problem.

[Math. 22]

$$\min_{\{c_f, w_f\}_{f=1}^F} \left( \sum_{f=1}^F L_{MV_f}(w_f) + \sum_{f=1}^F \sum_{d=1}^D \Lambda_{(f,d),c_{f,d}}(w_f^H a_{f,d}) + \sum_{f=1}^{F-1} \hat{L}_{\eta f}(c_f, c_{f+1}) \right) \qquad (23)$$

Similarly to the optimization problem in Expression (15), the optimization problem in Expression (23) can be solved at high speed by applying the Dijkstra method. The algorithm is shown in FIG. 4.

First Embodiment

From a signal (observation signal) resulting from observing sound (hereinafter referred to as target sound) from D (D is an integer equal to or more than 1) sound sources (hereinafter referred to as a sound source 1, ..., a sound source D), a filter coefficient optimization apparatus 100 calculates the optimum value w* of the filter coefficient w={$w_1, \ldots, w_F$} ($w_f$ (f=1, ..., F, F is an integer equal to or more than 1) is the filter coefficient of the frequency bin f) of the beamformer that emphasizes the target sound, using a microphone array constituted by M (M is an integer equal to or more than 1) microphone elements. The observation signal is an input data that is used for the optimization of the filter coefficient, and therefore, the observation signal is referred to as optimization data, hereinafter.

Figure 6:
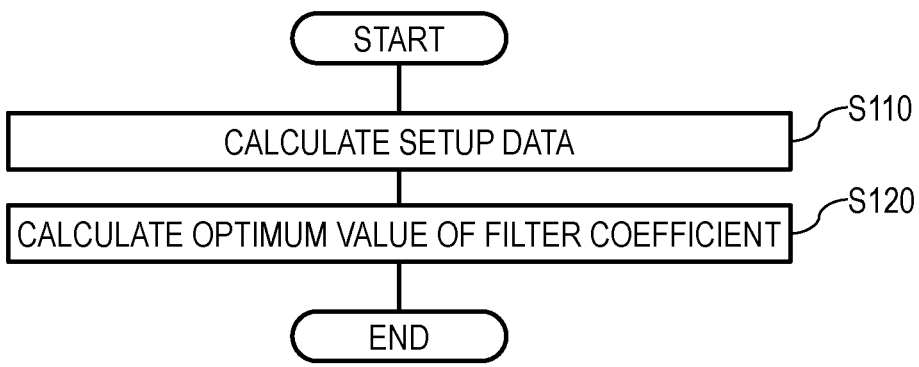
FIG. 6 is a flowchart showing the behavior of the filter coefficient optimization apparatus 100.

The filter coefficient optimization apparatus 100 will be described below with reference to FIG. 5 and FIG. 6. FIG. 5 is a block diagram showing the configuration of the filter coefficient optimization apparatus 100. FIG. 6 is a flowchart showing the behavior of the filter coefficient optimization apparatus 100. As shown in FIG. 5, the filter coefficient optimization apparatus 100 includes a setup data calculation unit 110, an optimization unit 120, and a recording unit 190. The recording unit 190 is a component unit that appropriately records the information necessary for the processing in the filter coefficient optimization apparatus 100. For example, the recording unit 190 records the filter coefficient that is an optimized object.

The behavior of the filter coefficient optimization apparatus 100 will be described with FIG. 6.

In S110, the setup data calculation unit 110 calculates setup data that is used at the time of the optimization of the filter coefficient w, using the optimization data. In the case of using the cost function for optimizing the filter coefficient w, examples of the setup data include a spatial correlation matrix $R_f$ (f=1, ..., F) for sound other than the target sound relevant to the frequency bin f and the array manifold vector $a_{f,d}$ (f=1, ..., F, d=1, ..., D) in the frequency bin f corresponding to a sound wave as a plane wave that comes from the angular direction $\theta_d$ (d=1, ..., D) in which the sound source d exists obtained based on the observation signal.

In S120, the optimization unit 120 calculates the optimum value w* of the filter coefficient w, using the setup data generated in S110. For example, the optimization unit 120 can calculate the optimization value w* based on the optimization problem $\min_w L(w)$ relevant to the filter coefficient w under a predetermined constraint condition. Here, $L_{MV\_f}(w_f)=w_f^H R_f w_f$ (f=1, . . . , F) is a cost function relevant to the filter coefficient $w_f$, and the function L(w) is a cost function relevant to the filter coefficient w and is defined using the sum of the sum $\Sigma_{f=1}^F L_{MV\_f}(w_f)$ of the function $L_{MV\_f}(w_f)$ and a predetermined regularization term. Further, the predetermined regularization term is a regularization term that is defined using the difference in phase between adjacent frequency bins relevant to the response $w_f^H a_{f,d}$ (f=1, . . . , F, d=1, . . . , D) of the beamformer in the frequency bin f for the angular direction $\theta_d$.

Some examples of the regularization term will be shown. Here, $\eta$ is a predetermined positive value, and $\angle(w_f^H a_{f,d})$ (f=1, . . . , F, d=1, . . . , D) expresses the phase of the response $w_f^H a_{f,d}$ of the beamformer in the frequency bin f for the angular direction $\theta_d$.

The first example is $\eta \Sigma_{f=1}^{F-1} \Sigma_{d=1}^D |\angle(w_f^H a_{f,d}) - \angle(w_{f+1}^H a_{f+1,d})|_{2\pi}$. The second example is $\eta \Sigma_{f=1}^{F-2} \Sigma_{d=1}^D |\angle(w_f^H a_{f,d}) - 2\angle(w_{f+1}^H a_{f+1,d}) + \angle(w_{f+2}^H a_{f+2,d})|_{2\pi}$.

The third example is $\eta \Sigma_{f=1}^{F-1} \Sigma_{d=1}^D |c_{f,d} - c_{f+1,d}|_c$. Here, C is an integer equal to or more than 1, and $c_{f,d}$ (f=1, . . . , F, d=1, . . . , D) is a discrete variable that has one value of 1, . . . , C that satisfies $\angle(w_f^H a_{f,d}) \in [2\pi(c_{f,d}-1)/C, 2\pi c_{f,d}/C]$ for the phase $\angle(w_f^H a_{f,d})$.

A case where the third example is used as the regularization term will be described below. In this case, an example of the constraint condition is expressed by the following expression.

[Math. 23]

$$w_f^H a_{f,1} = 1 \qquad (*)$$

(f=1, . . . , F)

Further, another example of the constraint condition is expressed by the following expression.

[Math. 24]

$$|w_f^H a_{f,d}| \geq 1 \qquad (**)$$

(f=1, . . . , F, d=1, . . . , D)

Case 1 and Case 2 will be described below. Case 1 is a case where the optimization unit 120 solves the optimization problem of the cost function that is defined using the sum of the sum $\Sigma_{f=1}^F L_{MV\_f}(w_f)$ of the cost function $L_{MV\_f}(w_f)$ and the regularization term $\eta \Sigma_{f=1}^{F-1} \Sigma_{d=1}^D |c_{f,d} - c_{f+1,d}|_c$ under a constraint condition (*). Case 2 is a case where the optimization unit 120 solves the optimization problem of the cost function that is defined using the sum of the sum $\Sigma_{f=1}^F L_{MV\_f}(w_f)$ of the cost function $L_{MV\_f}(w_f)$ and the regularization term $\eta \Sigma_{f=1}^{F-1} \Sigma_{d=1}^D |c_{f,d} - c_{f+1,d}|_c$ under a constraint condition (**).

(Case 1)

Figure 7:
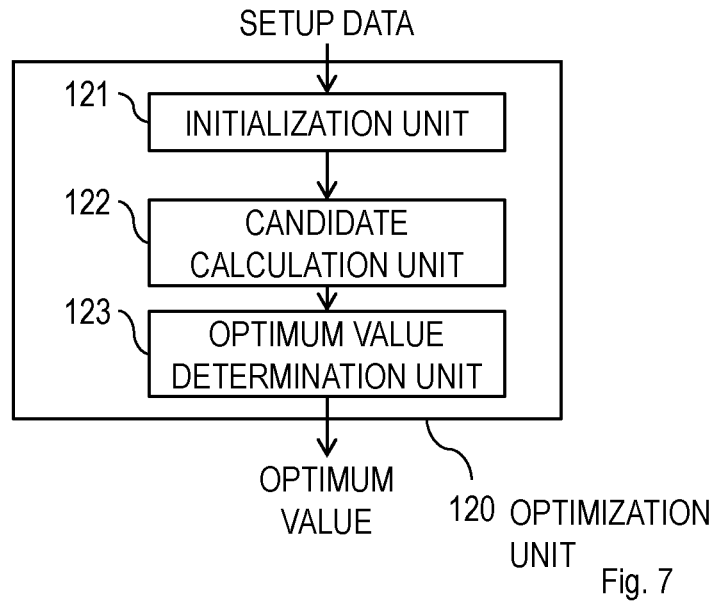
FIG. 7 is a block diagram showing the configuration of an optimization unit 120.
Figure 8:
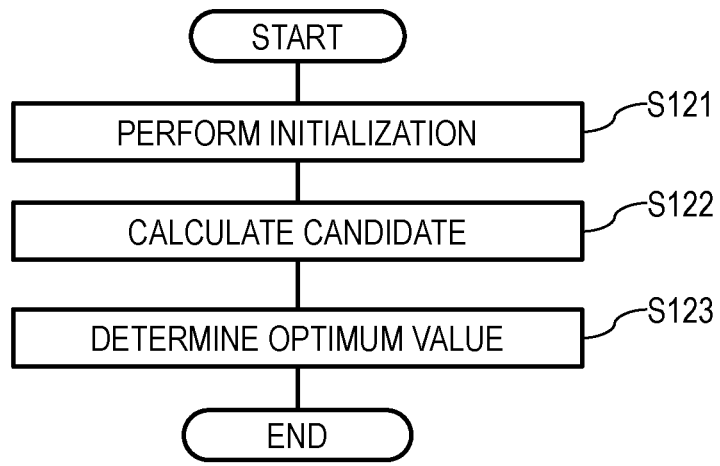
FIG. 8 is a flowchart showing the behavior of the optimization unit 120.

The optimization unit 120 will be described below with reference to FIG. 7 and FIG. 8. FIG. 7 is a block diagram showing the configuration of the optimization unit 120. FIG. 8 is a flowchart showing the behavior of the optimization unit 120. As shown in FIG. 7, the optimization unit 120 includes an initialization unit 121, a candidate calculation unit 122 and an optimum value determination unit 123.

The behavior of the optimization unit 120 will be described with FIG. 8. Here, $c_f = (c_{f,1}, \ldots, c_{f,D})$ (f=1, . . . , F) is a discrete variable that is defined by the discrete variable $c_{f,1}, \ldots, c_{f,D}$.

In S121, the initialization unit 121 initializes $\alpha_0[c_f]$ (f=1, . . . , F), by the following expression.

$$\alpha_0[c_f] = 0 \qquad [\text{Math. 25}]$$

In S122, the candidate calculation unit 122 calculates $\alpha_f[c_f]$ for all values that the discrete variable $c_f$ can have, for each the frequency f, and sets the value of the variable $c_{opt}$ to $c_{opt} = \text{argmin}_c \alpha_F[c]$.

[Math. 26]

$$w_f^{dp}[c_f] \leftarrow \underset{w_f}{\text{argmin}} L_{MV_f}(w_f)$$

$$\text{s.t.} \angle(w_f^H a_{f,d}) \in [2\pi(c_{f,d}-1)/C, 2\pi c_{f,d}/C]$$

$$(d = 1, \cdots, D)\ w_f^H a_{f,1} = 1$$

$$c_f^{prev}[c_f] \leftarrow \underset{c'_{f-1}}{\text{argmin}}(\alpha_{f-1}[c'_{f-1}] + \hat{L}_{\eta f-1}(c'_{f-1}, c_f))$$

$$\alpha_f[c_f] \leftarrow \alpha_{f-1}[c_f^{prev}[c_f]] + \hat{L}_{\eta f-1}(c_f^{prev}[c_f], c_f) + L_{MV_f}(w_f^{dp}[c_f])$$

$$(\hat{L}_{\eta f}(c_f, c_{f+1}) = \eta \sum_{d=1}^D |c_{f,d} - c_{f+1,d}|_c)$$

In S123, using the value of the variable $c_{opt}$ calculated in S122 as an input, the optimum value determination unit 123 calculates the optimum value $w_f^*$ of the filter coefficient $w_f$ and the value of the variable $c_{opt}$ for the frequency bin f, in descending order from F to 1, by the following expression, and obtains the optimum value w* from w*={$w_1^*$, . . . , $w_F^*$}.

$$w_f^* \leftarrow w_f^{dp}[c_{opt}]$$

$$c_{opt} \leftarrow c_f^{prev}[c_{opt}] \qquad [\text{Math. 27}]$$

(Case 2)

In this case, the optimization unit 120 may calculate the optimization value w* by solving an optimization problem $\min_{\{c_f, w_f\}}(\Sigma_{f=1}^F L_{MV\_f}(w_f) + \Sigma_{f=1}^F \Sigma_{d=1}^D \hat{\Lambda}_{(f,d), c\_f,d}(w_f^H a_{f,d}) + \eta \Sigma_{f=1}^{F-1} \Sigma_{d=1}^D |c_{f,d} - c_{f+1,d}|_c)$ relevant to the filter coefficient w and the discrete variable $c_1, \ldots, c_F$, instead of solving the optimization problem under the constraint condition (**). Here, $c_f = (c_{f,1}, \ldots, c_{f,D})$ (f=1, . . . , F) is a discrete variable that is defined by the discrete variable $c_{f,1}, \ldots, c_{f,D}$, and $\hat{\Lambda}_{(f,d), c\_f,d}$ (f=1, . . . , F, d=1, . . . , D) is a function relevant to a variable $\gamma_{f,d}$ that is defined by the following expression ($\gamma_{f,d} = w_f^H a_{f,d}$).

[Math. 28]

$$\Lambda_{(f,d), c_{f,d}}(\gamma_{f,d}) = \qquad (21)$$

$$\begin{cases} 0\left(R\left(\gamma_{f,d} e^{-2\pi j(c_{f,d}+1)/2C}\right) \geq 1, \dfrac{2\pi c_{f,d}}{C} \leq \angle \gamma_{f,d} \leq \dfrac{2\pi(c_{f,d}+1)}{C}\right) \\ \infty\ (\text{otherwise}) \end{cases}$$

The optimization unit 120 will be described below with reference to FIG. 7 and FIG. 8. FIG. 7 is a block diagram showing the configuration of the optimization unit 120. FIG. 8 is a flowchart showing the behavior of the optimization unit 120. As shown in FIG. 7, the optimization unit 120 includes an initialization unit 121, a candidate calculation unit 122 and an optimum value determination unit 123.

The behavior of the optimization unit 120 will be described with FIG. 8.

In S121, the initialization unit 121 initializes $\alpha_0[c_f]$ (f=1, ..., F), by the following expression.

$$\alpha_0[c_f]=0 \qquad \text{[Math. 29]}$$

In S122, the candidate calculation unit 122 calculates $\alpha_f[c_f]$ for all values that the discrete variable $c_f$ can have, for each the frequency bin f, and sets the value of the variable $c_{opt}$ to $c_{opt} = \mathrm{argmin}_c \alpha_F[c]$.

[Math. 30]

$$w_f^{dp}[c_f] \leftarrow \underset{w_f}{\mathrm{argmin}}\left(L_{MV_f}(w_f) + \sum_{d=1}^{D}\Lambda_{(f,d),c_{f,d}} w_f^H a_{f,d}\right)$$

$$c_f^{prev}[c_f] \leftarrow \underset{c'_{f-1}}{\mathrm{argmin}}(\alpha_{f-1}[c'_{f-1}] + \hat{L}_{\eta f-1}(c'_{f-1}, c_f))$$

$$\alpha_f[c_f] \leftarrow \alpha_{f-1}[c_f^{prev}[c_f]] + \hat{L}_{\eta f-1}(c_f^{prev}[c_f], c_f) +$$

$$L_{MV_f}(w_f^{dp}[c_f]) + \sum_{d=1}^{D}\Lambda_{(f,d),c_{f,d}}(w_f^{dp}[c_f])^H a_{f,d})$$

$$(^{\wedge}L_{\eta f}(c_f, c_{f+1}) = \eta\sum_{d=1}^{D}|c_{f,d} - c_{f+1,d}|_c)$$

In S123, using the value of the variable $c_{opt}$ calculated in S122 as an input, the optimum value determination unit 123 calculates the optimum value $w_f^*$ of the filter coefficient $w_f$ and the value of the variable $c_{opt}$ for the frequency bin f, in descending order from F to 1, by the following expression, and obtains the optimum value $w^*$ from $w^* = \{w_1^*, \ldots, w_F^*\}$.

$$w_f^* \leftarrow w_f^{dp}[c_{opt}]$$

$$c_{opt} \leftarrow c_f^{prev}[c_{opt}] \qquad \text{[Math. 31]}$$

As described above, it can be said that the optimization unit 120 calculates the optimum value $w^*$ by performing derivation so as to reduce the difference in phase between adjacent frequency bins relevant to the response $w_f^H a_{f,d}$ (f=1, ..., F, d=1, ..., D) of the beamformer in the frequency bin f for the angular direction $\theta_d$.

According to the embodiments of the present invention, it is possible to design a stable beamformer having a good quality, by optimizing the filter coefficient in consideration of the relationship of the filter coefficient between adjacent frequency bins.

<Supplement>

Figure 9:
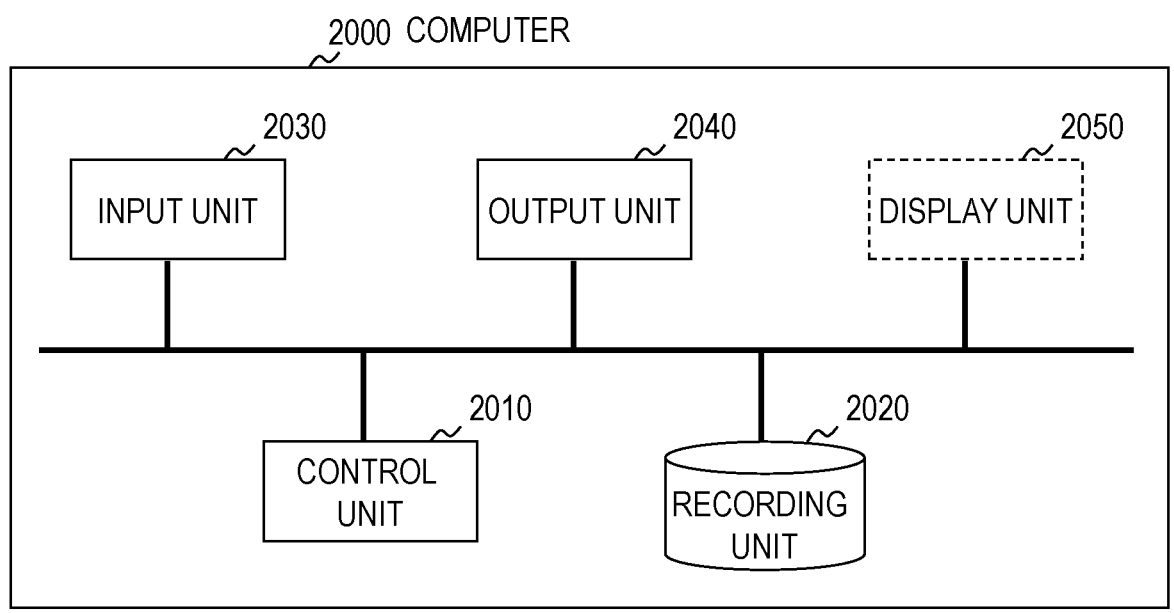
FIG. 9 is a diagram showing an example of the functional configuration of a computer that realizes apparatuses in embodiments of the present invention.

FIG. 9 is a diagram showing an example of the functional configuration of a computer that realizes the apparatuses described above. The processing in the apparatuses described above can be executed when a recording unit 2020 reads programs for causing a computer to function as the apparatuses described above and a control unit 2010, an input unit 2030, an output unit 2040 and the like to behave.

For example, as a single hardware entity, the apparatus in the present invention includes an input unit that can be connected with a keyboard and the like, an output unit that can be connected with a liquid crystal display and the like, a communication unit that can be connected with a communication device (for example, a communication cable) capable of communicating with the exterior of the hardware entity, a CPU (Central Processing Unit, a cache memory, a register and the like may be included), a RAM and a ROM that are memories, an external storage device that is a hard disk, and a bus that connects the input unit, the output unit, the communication unit, the CPU, the RAM, the ROM and the external storage device such that data can be exchanged. Further, as necessary, the hardware entity may be provided with a device (drive) that can perform reading and writing for a record medium such as a CD-ROM. As a physical entity including the hardware resources, there are a general-purpose computer and the like.

In the external storage device of the hardware entity, programs necessary for realizing the above functions, data necessary in the processing of the programs, and the like are stored (for example, the program may be stored in a ROM that is a read-only storage without being limited to the external storage device). Further, data and others obtained by the processing of the programs are appropriately stored in the RAM, the external storage device or the like.

In the hardware entity, the programs stored in the external storage device (or the ROM or the like) and the data necessary for the processing of the programs are read in the memory as necessary, and are appropriately interpreted, executed or processed by the CPU. As a result, the CPU realizes predetermined functions (the above component units expressed as the ... unit, the ... means and the like).

The present invention is not limited to the above-described embodiments, and modifications can be appropriately made without departing from the spirit of the present invention. Further, the processes described in the above embodiments do not need to be executed in a time-series manner in the order of the descriptions, and may be executed in parallel or individually, depending on the processing capacities of the devices that execute the processes or as necessary.

In the case where the processing functions in the hardware entity (the apparatus in the present invention) described in the above embodiments are realized by a computer as described above, the processing contents of the functions to be included in the hardware entity are described by programs. Then, the programs are executed by the computer, and thereby, the processing functions in the above hardware entity are realized on the computer.

The programs describing the processing contents can be recorded in a computer-readable record medium. As the computer-readable record medium, for example, a magnetic record device, an optical disk, a magneto-optical record medium, a semiconductor memory and others may be used. Specifically, for example, a hard disk device, a flexible disk, a magnetic tape or the like can be used as the magnetic record device, a DVD (Digital Versatile Disc), a DVD-RAM (Random Access Memory), a CD-ROM (Compact Disc Read Only Memory), a CD-R (Readable)/RW (ReWritable) or the like can be used as the optical disk, an MO (Magneto-Optical disc) or the like can be used as the magneto-optical record medium, and an EEP-ROM (Electronically Erasable and Programmable-Read Only Memory) or the like can be used as the semiconductor memory.

For example, the distribution of the programs is performed by sale, transfer, lending or the like of a portable record medium such as a DVD or CD-ROM in which the programs are recorded. Furthermore, the programs may be distributed by storing the programs in a storage device of a server computer and transmitting the programs from the server computer to another computer through a network.

For example, the computer that executes the programs, first, once stores the programs recorded in the portable record medium or the programs transmitted from the server computer, in its own storage device. Then, at the time of the execution of the processing, the computer reads a program stored in its own storage device, and executes a process in accordance with the read program. Further, as another form of the execution of the programs, the computer may read a program directly from the portable record medium, and may execute a process in accordance with the program.

Furthermore, whenever a program is transmitted from the server computer to the computer, the computer may execute a process in accordance with the received program. Further, the above-described processes may be executed by a so-called ASP (Application Service Provider) service in which the processing functions are realized by only execution instruction and result acquisition, without the transmission of the programs from the server computer to the computer. The program in the form includes information that is supplied for the processing by an electronic computer and that is similar to the program (for example, data that is not a direct command to the computer but has a property of prescribing the processing by the computer).

In the form, the hardware entity is configured by executing predetermined programs on the computer, but at least some of the processing contents may be realized in hardware.

The above description of the embodiment of the present invention has been presented for the purpose of exemplification and description. It is not intended to be exhaustive, and it is not intended to limit the invention to the disclosed strict form. Modifications and variations can be made from the above disclosure. The embodiments are selected and expressed, such that the best exemplification of the principle of the present invention is provided and such that a person skilled in the art can use the present invention as various embodiments suitable for deliberated actual use or can use the present invention while adding various modifications. All modifications and variations fall within the scope of the present invention that is determined by the attached claims interpreted based on a range given justly, lawfully and fairly.

The invention claimed is:

1. A filter coefficient optimization apparatus including an optimization unit that calculates an optimum value $w^*$ of a filter coefficient $w=\{w_1, \ldots, w_F\}$ ($w_f$(f=1, \ldots, F, F is an integer equal to or more than 1) is a filter coefficient of a frequency bin f) of a beamformer that emphasizes sound (hereinafter referred to as target sound) from D sound sources (hereinafter referred to as a sound source 1, \ldots, a sound source D), D being an integer equal to or more than 1, the optimization unit calculating the optimum value $w^*$ based on an optimization problem $\min_w L(w)$ relevant to the filter coefficient w, under a predetermined constraint condition, $L(w)$ being a cost function relevant to the filter coefficient w and being defined using a sum of a sum $\Sigma_{f=1}^{F} L_{MV\_f}(w_f)$ of a cost function $L_{MV\_f}(w_f)$ and a predetermined regularization term, $L_{MV\_f}(w_f) = w_f^H R_f w_f$ (f=1, \ldots, F) being a cost function relevant to the filter coefficient $w_f$, $R_f$(f=1, \ldots, F) being a spatial correlation matrix for sound other than the target sound relevant to the frequency bin f, the predetermined regularization term being defined using a difference in phase between adjacent frequency bins relevant to a response $w_f^H a_{f,d}$ (f=1, \ldots, F, d=1, \ldots, D) of the beamformer in the frequency bin f for an angular direction $\theta_d$, $\theta_d$(d=1, \ldots, D) being the angular direction in which a sound source d exists, and $a_{f,d}$(f=1, \ldots, F, d=1, \ldots, D) being an array manifold vector in the frequency bin f corresponding to a sound wave that comes from the angular direction $\theta_d$, the sound wave being a plane wave; and an output unit that sets the optimum value $w^*$ to the frequency bin of the beamformer and emphasizes at least a part of the sound wave as the target sound.

2. The filter coefficient optimization apparatus according to claim 1, wherein the predetermined regularization term is $\eta \Sigma_{f=1}^{F-1} \Sigma_{d=1}^{D} |\angle(w_f^H a_{f,d}) - \angle(w_{f+1}^H a_{f+1,d})|_{2\pi}$ or $\eta \Sigma_{f=1}^{F-2} \Sigma_{d=1}^{D} |\angle(w_f^H a_{f,d}) - 2\angle(w_{f+1}^H a_{f+1,d}) + \angle(w_{f+2}^H a_{f+2,d})|_{2\pi}$.

$\eta$ being a predetermined positive number, and $\angle(w_f^H a_{f,d})$ (f=1, \ldots, F, d=1, \ldots, D) being the phase of the response $w_f^H a_{f,d}$ of the beamformer in the frequency bin f for the angular direction $\theta_d$.

3. The filter coefficient optimization apparatus according to claim 1, wherein:

the predetermined regularization term is $\eta \Sigma_{f=1}^{F-1} \Sigma_{d=1}^{D} |c_{f,d} - c_{f+1,d}|_C$.

$\eta$ being a predetermined positive number,

C being an integer equal to or more than 1, $\angle(w_f^H a_{f,d})$ (f=1, \ldots, F, d=1, \ldots, D) being the phase of the response $w_f^H a_{f,d}$ of the beamformer in the frequency bin f for the angular direction $\theta_d$, and $c_{f,d}$(f=1, \ldots, F, d=1, \ldots, D) being a discrete variable having one value of 1, \ldots, C that satisfies $\angle(w_f^H a_{f,d}) \in [2\pi(c_{f,d}-1)/C, 2\pi c_{f,d}/C]$ for the phase $\angle(w_f^H a_{f,d})$.

4. The filter coefficient optimization apparatus according to claim 3, wherein the predetermined constraint condition is expressed by the following expression:

$$w_f^H a_{f,d} = 1 \quad \text{[Math. 32]}$$

(f=1, \ldots, F).

5. The filter coefficient optimization apparatus according to claim 3, wherein the predetermined constraint condition is expressed by the following expression:

$$w_f^H a_{f,d} \geq 1 \quad \text{[Math. 33]}$$

(f=1, \ldots, F, d=1, \ldots, D).

6. The filter coefficient optimization apparatus according to claim 4, wherein the optimization unit includes a candidate calculation unit that calculates $\alpha_f[c_f]$ for all values that a discrete variable $c_f$ can have, for each frequency bin f, by the following expression, and adopts $c_{opt} = \text{argmin}_c \alpha_F[c]$ as a value of a variable $c_{opt}$, $c_f = (c_{f,1}, \ldots, c_{f,D})$ (f=1, \ldots, F) being the discrete variable that is defined by a discrete variable $c_{f,1}, \ldots, c_{f,D}$.

[Math. 34]

$$w_f^{dp}[c_f] \leftarrow \underset{w_f}{\text{argmin}} L_{MV_f}(w_f)$$

$$\text{s.t.} \angle\left(w_f^H a_{f,d}\right)$$

$$\in [2\pi(c_{f,d} - 1)/C, 2\pi c_{f,d}/C]$$

$$(d = 1, \ldots, D), w_f^H a_{f,1} = 1$$

$$c_f^{prev}[c_f] \leftarrow \underset{c_{f-1}'}{\text{argmin}}(\alpha_{f-1}[c_{f-1}'] + \hat{L}_{\eta f-1}(c_{f-1}', c_f))$$

$$\alpha_f[c_f] \leftarrow \alpha_{f-1}[c_f^{prev}[c_f]] + \hat{L}_{\eta f-1}(c_f^{prev}[c_f], c_f) + L_{MV_f}(w_f^{dp}[c_f])$$

$$(\hat{L}_{\eta f}(c_f, c_{f+1}) = \eta \sum_{d=1}^{D} |c_{f,d} - c_{f+1,d}|_C), \text{ and}$$

an optimum value determination unit that calculates an optimum value $w_f^*$ of the filter coefficient $w_f$ and the value of the variable $c_{opt}$ for the frequency bin f, in descending order from F to 1, by the following expression, and obtains the optimum value w* from $w^*=\{w_1^*, \ldots, w_F^*\}$:

$$w_f^* \leftarrow w_f^{dp}[c_{opt}]$$

$$c_{opt} \leftarrow c_f^{prev}[c_{opt}]. \quad [\text{Math. 35}]$$

7. The filter coefficient optimization apparatus according to claim 5, wherein:

$$\Lambda_{(f,d),c_{f,d}}(\gamma_{f,d}) =$$
$$\begin{cases} 0 \left( R\left(\gamma_{f,d} e^{-2\pi j(c_{f,d}+1)/2C}\right) \geq 1, \frac{2\pi c_{f,d}}{C} \leq \angle \gamma_{f,d} \leq \frac{2\pi(c_{f,d}+1)}{C} \right) \\ \infty \text{ (otherwise)} \end{cases}$$

the optimization unit calculates the optimum value w* by solving an optimization problem $\min_{\{c\_f,w\_f\}} (\Sigma_{f=1}^F L_{MV\_f}(w_f) + \Sigma_{f=1}^F \Sigma_{d=1}^D \hat{\Lambda}_{(f,d)c\_f,d}(w_f^H a_{f,d})) + \eta \Sigma_{f=1}^{F-1} \Sigma_{d=1}^D |d_{f,d} - c_{f+1,3|c}|)$ relevant to the filter coefficient w and a discrete variable $c_1, \ldots, c_F$, instead of solving the optimization problem $\min_w L(w)$,
$c_f = (c_{f,1}, \ldots, c_{f,D})$ $(f=1, \ldots, F)$ being the discrete variable that is defined by the discrete variable $c_{f,1}, \ldots, c_{f,D}$, and $\hat{\Lambda}_{(f,d),c\_f,d}(f=1, \ldots, F, d=1, \ldots, D)$ is a function relevant to a variable $\gamma_{f,d}$ that is defined by the following expression $(\gamma_{f,d} = w_f^H a_{f,d})$:

[Math. 36]

$$\Lambda_{(f,d),c_{f,d}}(\gamma_{f,d}) =$$
$$\begin{cases} 0 \left( R\left(\gamma_{f,d} e^{-2\pi j(c_{f,d}+1)/2C}\right) \geq 1, \frac{2\pi c_{f,d}}{C} \leq \angle \gamma_{f,d} \leq \frac{2\pi(c_{f,d}+1)}{C} \right) \\ \infty \text{ (otherwise)} \end{cases}.$$

8. The filter coefficient optimization apparatus according to claim 7, wherein
the optimization unit includes
a candidate calculation unit that calculates $\alpha_f[c_f]$ for all values that the discrete variable $_f$ can have, for each frequency bin f, by the following expression, and adopts as a $C_{opt} = \text{argmin}_c \alpha_F[c]$ value of a variable $c_{opt}$:

[Math. 37]

$$w_f^{dp}[c_f] \leftarrow \underset{w_f}{\text{argmin}}\left(L_{MV_f}(w_f) + \sum_{d=1}^D \Lambda_{(f,d),c_{f,d}}(w_f^H a_{f,d})\right)$$

$$c_f^{prev}[c_f] \leftarrow \underset{c'_{f-1}}{\text{argmin}}\left(\alpha_{f-1}[c'_{f-1}] + \hat{L}_{\eta f-1}(c'_{f-1}, c_f)\right)$$

$$\alpha_f[c_f] \leftarrow \alpha_{f-1}\left[c_f^{prev}[c_f]\right] + \hat{L}_{\eta f-1}(c_f^{prev}[c_f], c_f) +$$

$$L_{MV_f}\left(w_f^{dp}[c_f]\right) + \sum_{d=1}^D \Lambda_{(f,d),c_{f,d}}\left(w_f^{dp}[c_f]^H a_{f,d}\right)$$

$$(\wedge L_{\eta f}(c_f, c_{f+1}) = \eta \sum_{d=1}^D |c_{f,d} - c_{f+1,d}|_c) \text{ and}$$

an optimum value determination unit that calculates an optimum value $w_f^*$ of the filter coefficient $w_f$ and the value of the variable Copt for the frequency bin f, in descending order from F to 1, by the following expression, and obtains the optimum value w* from $w^*=\{w_1^*, \ldots, w_F^*\}$:

$$w_f^* \leftarrow w_f^{dp}[c_{opt}]$$

$$c_{opt} \leftarrow c_f^{prev}[c_{opt}]. \quad [\text{Math. 38}]$$

9. A filter coefficient optimization apparatus including an optimization unit that calculates an optimum value w* of a filter coefficient $w=\{w_1, \ldots, w_F\}$ ($w_f(f=1, \ldots, F, F$ is an integer equal to or more than 1) is a filter coefficient of a frequency bin f) of a beamformer that emphasizes sound (hereinafter referred to as target sound) from D sound sources (hereinafter referred to as a sound source 1, ..., a sound source D), D being an integer equal to or more than 1,
the optimization unit calculating the optimum value w* by performing derivation so as to reduce a difference in phase between adjacent frequency bins relevant to a response $w_f^H a_{f,d}(f=1, \ldots, F, d=1, \ldots, D)$ of the beamformer in the frequency bin f for an angular direction $\theta_d$,
$\theta_d(d=1, \ldots, D)$ being the angular direction in which a sound source d exists,
$a_{f,d}(f=1, \ldots, F, d=1, \ldots, D)$ being an array manifold vector in the frequency bin f corresponding to a sound wave that comes from the angular direction $\theta_d$, the sound wave being a plane wave; and
an output unit that sets the optimum value w* to the frequency bin of the beamformer and emphasizes at least a part of the sound wave as the target sound.

10. A filter coefficient optimization method including an optimization step in which a filter coefficient optimization apparatus calculates an optimum value w* of a filter coefficient $w=\{w_1, \ldots, w_F\}$ ($w_f(f=1, F$ is an integer equal to or more than 1) is a filter coefficient of a frequency bin f) of a beamformer that emphasizes sound (hereinafter referred to as target sound) from D sound sources (hereinafter referred to as a sound source 1, ..., a sound source D), D being an integer equal to or more than 1,
the optimization step being a step of calculating the optimum value w* based on an optimization problem $\min_w L(w)$ relevant to the filter coefficient w, under a predetermined constraint condition,
L(w) being a cost function relevant to the filter coefficient w and being defined using a sum of a sum $\Sigma_{f=1}^F 1_{MV\_f}(w_f)$ of a cost function $L_{MV\_f}(w_f)$ and a predetermined regularization term,
$L_{MV\_f}(w_f) = w_f^H R_f w_f(f=1, \ldots, F)$ being a cost function relevant to the filter coefficient $w_f$,
$R_f(f=1, \ldots, F)$ being a spatial correlation matrix for sound other than the target sound relevant to the frequency bin f,
the predetermined regularization term being defined using a difference in phase between adjacent frequency bins relevant to a response $w_f^H a_{f,d}(f=1, \ldots, F, d=1, \ldots, D)$ of the beamformer in the frequency bin f for an angular direction $\theta_d$,
$\theta_d(d=1, \ldots, D)$ being the angular direction in which a sound source d exists, and
$a_{f,d}(f=1, \ldots, F, d=1, \ldots, D)$ being an array manifold vector in the frequency bin f corresponding to a sound wave that comes from the angular direction $\theta_d$, the sound wave being a plane wave; and
an output step that sets the optimum value w* to the frequency bin of the beamformer and emphasizes at least a part of the sound wave as the target sound.

11. A filter coefficient optimization method including an optimization step in which a filter coefficient optimization apparatus calculates an optimum value w* of a filter coefficient $w=\{w_1, \ldots, w_F\}$ ($w_f(f=1, \ldots, F, F$ is an integer equal to or more than 1) is a filter coefficient of a frequency bin f) of a beamformer that emphasizes sound (hereinafter referred to as target sound) from D sound sources (hereinafter referred to as a sound source 1, . . . , a sound source D), D being an integer equal to or more than 1, the optimization step being a step of calculating the optimum value $w^*$ by performing derivation so as to reduce a difference in phase between adjacent frequency bins relevant to a response $w_f^H a_{f,d}$ (f=1, . . . , F, d=1, . . . , D) of the beamformer in the frequency bin f for an angular direction $\theta_d$, $\theta_d$(d=1, . . . ,D) being the angular direction in which a sound source d exists, and $a_{f,d}$(f=1, . . . , F, d=1, . . . , D) being an array manifold vector in the frequency bin f corresponding to a sound wave that comes from the angular direction $\theta_d$, the sound wave being a plane wave; and an output step that sets the optimum value $w^*$ to the frequency bin of the beamformer and emphasizes at least a part of the sound wave as the target sound.

12. A non-transitory computer-readable recording medium storing a program that causes a computer to function as the filter coefficient optimization apparatus according to claim 1.

13. A non-transitory computer-readable recording medium storing a program that causes a computer to function as the filter coefficient optimization apparatus according to claim 9.

\* \* \* \* \*

UNITED STATES PATENT AND TRADEMARK OFFICE
CERTIFICATE OF CORRECTION

| | |
|---|---|
| PATENT NO. | : 12,120,490 B2 |
| APPLICATION NO. | : 17/801754 |
| DATED | : October 15, 2024 |
| INVENTOR(S) | : Ryotaro Sato |

It is certified that error appears in the above-identified patent and that said Letters Patent is hereby corrected as shown below:

In the Claims

In Column 17, Line 37 of Claim 1, the text reading:
- w={w$_1$, ..., W$_F$} -
Should read:
-- w={w$_1$, ..., w$_F$} --

In Column 17, Line 59 of Claim 1, the text reading:
- (f=1, ..., F, d=1, ..., D) -
Should read:
-- (f=1, ..., F, d=1, ..., D) --

In Column 18, Line 8 of Claim 2, the text reading:
- -2∠(w$_{f+1}$$^H$a$_{f+1}$$^H$a$_{f+1,d}$) -
Should read:
-- -2∠(w$_{f+1}$$^H$a$_{f+1,d}$) --

In Column 18, Line 35 of Claim 5, the text reading:
- w$_f$$^H$a$_{f,d}$ ≥ 1 -
Should read:
-- |w$_f$$^H$a$_{f,d}$| ≥ 1 --

In Column 19, Line 20 of Claim 7, the text reading:
- Σ$_{f=1}$$^F$Σ$_{d=1}$$^D$∧$_{(f,d),c\_f,d}$(w$_f$$^H$a$_{f,d}$) -
Should read:
-- Σ$_{f=1}$$^F$Σ$_{d=1}$$^D$∧$_{(f,d),c\_f,d}$(w$_f$$^H$a$_{f,d}$) --

In Column 19, Line 21 of Claim 7, the text reading:
- ηΣ$_{f=1}$$^{F-1}$Σ$_{d=1}$$^D$ |d$_{f,d}$-c$_{f+1,3|c}$ -

Signed and Sealed this
Eighteenth Day of March, 2025

Coke Morgan Stewart
*Acting Director of the United States Patent and Trademark Office*

CERTIFICATE OF CORRECTION (continued)
U.S. Pat. No. 12,120,490 B2

Should read:
-- $\eta \Sigma_{f=1}^{F-1} \Sigma_{d=1}^{D} | c_{f,d} - c_{f+1,d} |_c$ --

In Column 19, Line 42 of Claim 8, the text reading:
- the discrete variable $_f$ -
Should read:
-- the discrete variable $c_f$ --

In Column 19, Line 44 of Claim 8, the text reading:
- as a $C_{opt}$ -
Should read:
-- as a $c_{opt}$ --

In Column 19, Line 64 of Claim 8, the text reading:
- the variable $C_{opt}$ -
Should read:
-- the variable $c_{opt}$ --

In Column 20, Line 42 of Claim 10, the text reading:
- a sum $\sum_{f=1}^{F} 1_{MV\_f}(w_f)$ -
Should read:
-- a sum $\sum_{f=1}^{F} L_{MV\_f}(w_f)$ --